(12) United States Patent
Hirano (10) Patent No.: US 6,371,198 B1
(45) Date of Patent: Apr. 16, 2002

(54) HEAT STORAGE DEVICE

(75) Inventor: Satoshi Hirano, Tsukuba (JP)

(73) Assignee: Agency of Industrial Science and Technology, Tokyo (JP)

(*) Notice: Subject to any disclaimer, the term of this patent is extended or adjusted under 35 U.S.C. 154(b) by 0 days.

(21) Appl. No.: 09/505,687

(22) Filed: Feb. 17, 2000

(30) Foreign Application Priority Data

Feb. 23, 1999 (JP) .......................................... 11-045099

(51) Int. Cl.[7] .............................................. F28D 17/00
(52) U.S. Cl. ......................... 165/10; 165/902; 62/430; 126/641; 126/643; 126/617; 126/618
(58) Field of Search ...................... 165/10, 902, 104.17, 165/145; 62/393, 434, 59, 430; 126/400, 617, 641, 593, 618, 643

(56) References Cited

U.S. PATENT DOCUMENTS

| | | | |
|---|---|---|---|
| 1,069,949 A | * 8/1913 | Hassler | 165/10 |
| 2,277,311 A | * 3/1942 | Freeman | 165/902 |
| 2,856,506 A | * 10/1958 | Telkes | 165/10 |
| 3,400,249 A | * 9/1968 | Mekjean et al. | 165/10 |
| 4,187,831 A | * 2/1980 | Eubank | 165/10 |
| 4,265,224 A | * 5/1981 | Meyer | 165/902 |
| 5,687,706 A | * 11/1997 | Goswami et al. | 165/902 |
| 5,944,089 A | * 8/1999 | Roland | 165/10 |

* cited by examiner

*Primary Examiner*—Henry Bennett
*Assistant Examiner*—Terrell McKinnon
(74) *Attorney, Agent, or Firm*—Oblon, Spivak, McClelland, Maier & Neustadt, P.C.

(57) ABSTRACT

A heat storage device comprises a heat storage tank 2 charged with a heat storage material 1 for storing the heat supplied from the outside, and a heat exchanger 3 for executing an injection and an extraction of heat between the inside of the storage tank 2 and the outside by the heat exchange between the heat storage material and a heat transfer medium. The heat exchanger 3 is disposed so as to execute a heat exchange between the central portion 2a in the heat storage tank 2 and the outside, and suppresses the natural convection of the heat storage material 1 of the outer portion 2b by, for example, dispersing a liquid-absorbent material 5 in the outer portion 2b surrounding the central portion in the heat storage tank 2, whereby reduces the influence of external environment on the central portion 2a in the heat storage tank, thereby suppressing the heat loss toward the outside.

7 Claims, 6 Drawing Sheets

HEAT STORAGE DEVICE

FIELD OF THE INVENTION

The present invention relates to a heat storage device for temporarily storing heat.

DESCRIPTION OF THE RELATED ART

Figure 11:
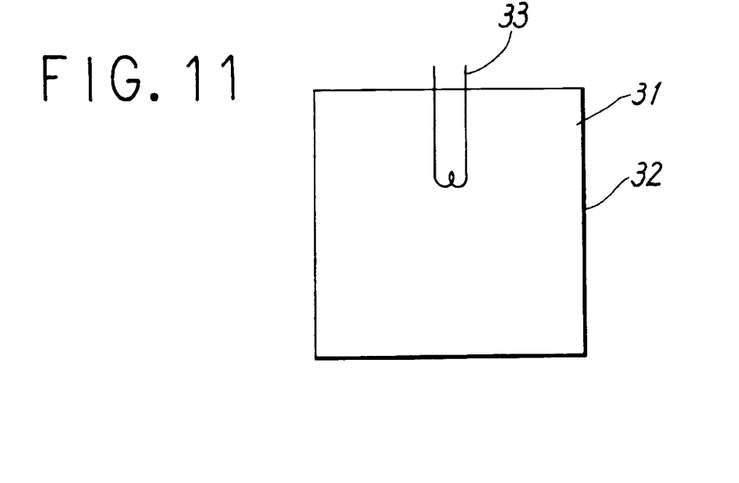
FIGS. 11 through 13 are sectional views showing varied examples of conventional heat storage devices.
Figure 12:
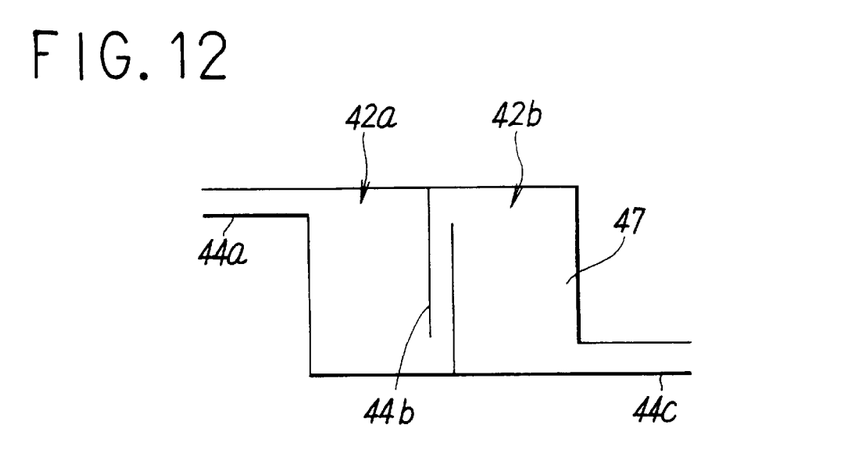
Figure 13:
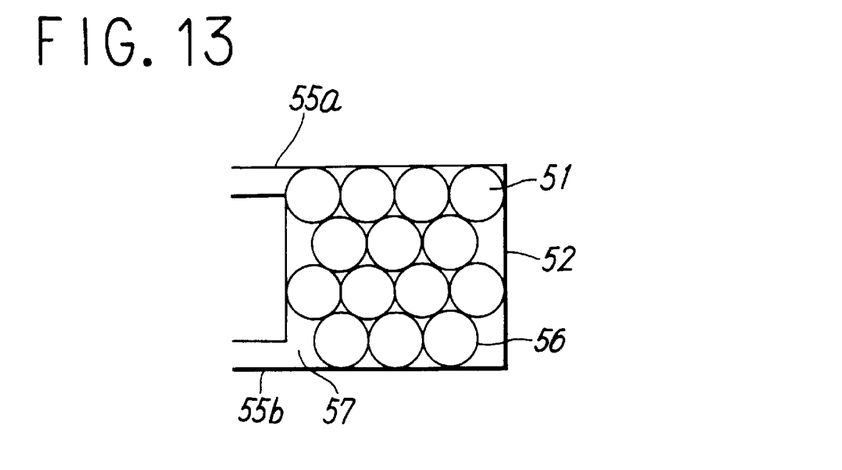

Basic constructions of conventional heat storage devices are illustrated in FIGS. 11 through 13 in the form of sectional views.

A heat storage device shown in FIG. 11 comprises a heat storage tank 32 charged with a heat storage material 31 such as water, and a heat exchanger 33 disposed in the heat storage tank 32, for executing a heat exchange with the outside. In order to store the heat of, for example, a temperature $T_X$ within this heat storage device, the temperature of the heat storage material 31 is raised to $T_X$ by adding the heat of a temperature of at least $T_X$ to the heat exchanger 33 from the outside. When heat is needed at the outside, the heat of the temperature $T_X$ is extracted from the heat storage material 31 to the outside, using the heat exchanger 33.

A heat storage device as shown in FIG. 12 comprises heat storage tanks 42a and 42b charged with a heat transfer medium 47 such as water which also serves as a heat storage material for storing heat, wherein the heat storage tank 42a has a communicating tube 44a for connecting the heat storage tank 1 with the outside, wherein the heat storage tanks 42a and 42b are connected by a communicating tube 44b, and wherein the heat storage tank 42b has a communicating tube 44c for connecting the heat storage tank 42b with the outside.

In the operation of this heat storage device, in order to store the heat of, for example, a temperature $T_X$, the heat transfer medium 47 is sucked out from the communicating tube 44c, and the temperature of the heat transfer medium 47 is raised to at least $T_X$ by adding heat to the heat transfer medium 47 at the outside, then the heat transfer medium 47 being injected from the communicating tube 44a to the heat storage tanks 42a. The heat transfer medium 47 removed from the heat storage tank 42a by this injection, arrives at the heat storage tanks 42a passing through the communicating tube 44a. After a while, the heat transfer medium 47 is sucked out from the communicating tube 44c, and executes a heat transport between the heat storage tank 42 and the outside, then returning to the heat storage tank 42a again passing through the communicating tube 44a. Thus, a circulation of the heat transfer medium 47 is accomplished. If heat is needed at the outside, a process in the opposite direction to the injection process of heat is executed. That is, the heat transfer medium 47 is sucked out from the communicating tube 44a, and heat is absorbed and utilized at the outside, and the heat transfer medium 47 of which temperature has decreased as a result of the absorption and utilization of heat, is returned from the communicating tube 44c to the heat storage tank 42b. Due to this returning, the heat transfer medium 47 removed from the heat storage tanks 42b flows into the heat storage tank 42a passing through the communicating tube 44b. Thus, a circulation of the heat transfer medium 47 is accomplished.

An object of suitably dividing the heat storage tank is to suppress the occurrence of a dead water region where flow is apt to stagnate within the heat storage tank, and to allow the circulation of the heat transfer medium 47 in injecting and extracting heat to be uniformly conducted by using the whole of the heat storage tank.

If the heat of a lower temperature than an ambient temperature is stored, the directions of flow of the heat transfer medium 47 in the processes of injection and extraction will be opposite to each other. However, the basic operation is similar to the foregoing.

On the other hand, in a heat storage device shown in FIG. 13, a heat storage material 51 utilizing mainly transition heat is charged into small vessels 56, which are accommodated in the heat storage tank 52, and the heat storage tank 52 is provided with communicating tubes 55a and 55b for making the heat storage tank 52 communicate with the outside. By the heat transfer medium 57 which circulates through these communicating tubes 55a and 55b and the heat storage tank, heat exchange means for executing a heat exchange with the outside is constituted. In this case, the storage of heat is mainly executed by the heat storage material 51 which utilizes a transition heat. Although the heat transfer medium 57 functions as heat transport means, it does not mean that the heat transfer medium 57 does not participate in the storage of heat.

In this heat storage device, in order to store the heat of, for example, a temperature $T_X$, the heat transfer medium 57 having a temperature of at least $T_X$ is injected from the outside to the heat storage tank 52 through the communicating tube 55a. The heat storage material 51 is heated by the heat which has been released by the heat transfer medium 57 via the walls of the small vessels 56. The heat transfer medium 57 injected returns to the outside passing through the communicating tube 55b, and is again heated to a temperature of at lease $T_X$. Thus, a similar circulation is repeated. If heat is needed at the outside, a process in the opposite direction to the process of heat injection is executed. That is, the heat transfer medium 57 is injected from the outside to the heat storage tank 52 through the communicating tube 55b. The heat transfer medium 57 injected is heated by the heat released by the heat transfer medium 51, via the walls of the small vessels 56. The heat transfer medium 57 heated returns to the outside passing through the communicating tube 55a, and its temperature becomes lower than $T_X$ as a result of the utilization at the outside, then being injected again. Thus, a similar circulation is repeated. Also in the case where the heat of a lower temperature than the ambient temperature is stored, the basic operation is similar to the foregoing.

In this example of constitution, since the heat transfer medium 57 which is injected and extracted from the outside passes through the gaps between the small vessels, the area of a heat transfer surface to the heat storage material 51 becomes large, as well as the treatment of the heat storage material 51 becomes easy, and hence such a constitution is often used for heat storage devices that use paraffin as a heat storage material 51 which utilizes transition heat.

In the above-described heat storage devices shown in FIGS. 11 through 13, in the state of heat storage, if there are temperature differences between the heat storage materials 31, 51, and the heat transfer medium 47 which also serves as a heat storage material, and the external environment surrounding the heat storage tanks 32, 42, and 52, then heat transfer always takes place between the heat storage devices and the external environment through the wall surfaces of heat storage tanks 32, 42, and 52, respectively.

Neglecting the influence of heat radiation which is usually low, the heat loss Q of a heat storage material or a heat transfer medium which also serves as a heat storage material (hereinafter these are both referred to as a heat storage material) is expressed by the following equation.

$$Q=\int_0^t kA(T_x'-T_0)dt [J] \qquad (1)$$

Here, k denotes an overall heat transfer coefficient determined by the material, construction, and ambient air speed of a heat storage tank, etc. A denotes a contact area between a heat storage tank and a ambient fluid (such as air). To represents an environmental temperature outside the heat storage device, and $T_X'$ represents a temperature at the surface where the heat storage material contacts the heat storage tank (the surface of heat storage material), t representing an elapsed time. Since k and A can usually be regarded as constants irrespective of time, the equation (1) may be expressed approximately as follows:

$$Q = kA \int_0^t (Tx' - T_0) dt [J] \qquad (2)$$

Some heat storage methods mainly utilize a sensible heat of the heat storage material 31 or the heat transfer medium 47 as in the cases shown in FIGS. 11 and 12, and other heat storage methods mainly utilize a transition heat of the heat storage material 51 as in the case shown in FIG. 13. Whichever heat of a sensible heat or a transition heat may be utilized, in order to store the heat of, for example, a temperature of $T_X$, it is necessary for the surface temperature $T_X'$ of the heat storage material to be maintained at a temperature of at least $T_x$. However, the greater is the temperature difference between the surface temperature $T_X'$ of the heat storage material and the ambient temperature $T_0$ in the outside, and also the longer is the storage time, the larger the heat loss represented in the equation (2) becomes, which results in a marked reduction in heat storage efficiency.

In order to reduce the heat loss from the heat storage tank in the equation (2), therefore, it is necessary to reduce the overall heat transfer coefficient k and/or the surface area A and shorten the time t, or to reduce the difference between the surface temperature of the heat storage material $T_X'$ and the environmental temperature $T_0$.

As a method for reducing the overall heat transfer coefficient k, an attempt to install a heat insulator around the periphery of the heat storage tank has been made. As a method for reducing the surface area, there has been made an attempt to make the heat storage tank have a shape having a small surface area per a unit volume, such as a cube or a sphere.

As a method for shorten the time t, there has been made an attempt to optimize the system control over heat application system after the re-extraction of heat. However, since the time term and temperature term in the equation (2) are associated with the original purpose of the heat storage, they can not be widely changed by nature.

On the other hand, in the examples shown in FIGS. 11 and 12, since the temperature of the heat storage material gradually approaches that of the external environment from the portions closer to the wall surfaces of the heat storage tanks 32 and 42, a temperature difference is generated within the heat storage material. In general, since a matter expands or contracts as it changes in temperature, once a temperature difference is generated in the heat storage material, a density difference occurs therein, and a gravity difference is caused. As a consequence, a movement called a natural convection is induced within the heat storage material.

Therefore, a natural convection takes place from the vicinity of the wall surfaces of the heat storage tank 32 and 42 that have the highest temperature difference between the same and the external environment, that is, from the outer portions in the heat storage material, and it spreads throughout the heat storage material. Consequently, heat storage material having a temperature closer to the temperature of external environment rather than to the heat stored flows from the surface side into the inner portion of the heat storage material, and simultaneously, the heat stored in the surface of the heat storage material transfers, whereby heat transfer always takes place between the heat storage material and the external environment through the wall surface of the heat storage tank, and hence causes a large heat loss within the heat storage material.

In the above-described heat storage device shown FIG. 13, in the conservation process of heat, the natural convection of the heat storage material 51 within the heat storage tank 52 is suppressed by small vessels 56, but a natural convection is generated within the heat transfer medium 57 stagnating in the heat storage tank 52. Accordingly, with regard to the heat transfer medium 57, the same as the case of the heat storage materials 31 and 47 of the heat storage devices shown in FIGS. 11 and 12 holds true.

In this way, since the temperature of the heat storage material changes to the temperature close to that of the external environment from the heat storage material in the portion closer to the wall surface of heat storage tanks, a temperature difference is generated between the outer and inner portions within the heat storage material (in the case of spherical heat storage tank, in the radial direction) in the process of heat transfer. Consequently, since a natural convection is induced within the heat storage material, heat transfer always takes place between the heat storage material and the external environment through the wall surface of heat storage tank, incurring a heat loss of the heat storage material.

In the above-described conventional heat storage devices shown in FIGS. 11 through 13, since the heat storage materials tend to easily flow in any case, a natural convection throughout the heat storage material is prone to occur not only in the process of conservation of heat, but also particularly in the processes of the injection and extraction of heat due to a temperature difference as a result of heat exchange. This incurs an increase in the overall heat transfer coefficient k in the equation (2), and an increase in the heat loss from the heat storage material to the outside, which constitutes one of the factors reducing a heat recovery rate.

SUMMARY OF THE INVENTION

The present invention has been achieved to overcome the heat loss from a heat storage material as described above and aims to provide a heat storage device capable of reducing the influence of external environment on the inside portion of a heat storage tank and suppressing the heat loss toward the outside, by reducing the temperature difference between the surface of the heat storage material and the external environment, and at the same time, by suppressing the heat transfer between the surface of the heat storage material and the inside portion of the heat storage material which executes injection and extraction between the same and the external environment. A first heat storage device for achieve the above-mentioned object comprises: a heat storage tank charged with a heat storage material for storing the heat provided from the outside; and heat exchange means which executes the injection and extraction of heat between the inside of a heat storage tank and the outside by the heat exchange between the heat storage material and the heat transfer medium, wherein the heat exchange means is disposed so as to execute a heat exchange between the central portion of the heat storage tank and the outside, or so that the central portion and the outer portion in the heat storage tank being caused to perform a heat exchange with the outside sequentially or individually, and wherein suppressing means are disposed in the outer portion in the heat storage tank, for suppressing the natural convection of the heat storage material.

A second heat storage device for achieve the above-mentioned object comprises: a heat storage tank charged with a heat transfer medium which also serves as a heat storage material for storing heat supplied from the outside; and heat transport means which executes an injection and extraction of heat between the inside of the heat storage tank and the outside by the inflow and outflow of the heat transfer medium, wherein the heat transport means is disposed so as to execute a heat transport between the central portion of the heat storage tank and the outside, and wherein suppressing means are disposed in the outer portion in the heat storage tank, for suppressing the natural convection of the heat storage material.

In the above-described heat storage devices, suppressing means may be constituted by: dispersing a liquid-absorbent material into the heat storage material or heat transfer medium in the outer portion in the heat storage tank; providing the heat storage material or heat transfer medium in the outer portion in the heat storage tank with a property of increasing viscosity by the application of voltage, and providing the heat storage device with means for applying power between a pair of electrodes which are disposed on opposite sides of the outer portion in the heat storage tank so as to sandwich the outer portion; or providing the heat storage material or heat transfer medium in the outer portion in the heat storage tank with a property of increasing viscosity by the application of magnetic force, and providing the heat storage device with a magnet for exerting a magnetic force on the outer portion in the heat storage tank; and further providing the outer portion in the heat storage tank with a barrier for hindering the natural convection of the heat storage material or heat transfer medium.

Also, in the above-described heat storage devices, there can be provided means for promoting the heat transfer between the central portion and the outer portion in the heat storage tank.

In the heat storage device having the above-described constitution, the heat of a temperature more than necessary at the heat extraction is injected to the heat storage tank by heat exchange means which execute a heat exchange with the central portion in the heat storage tank or by heat transport means which transport heat to the central portion, and then the heat is transferred to, stored in, and conserved in the heat storage material or heat transfer medium which is accommodated mainly in the outer portion in the heat storage tank. As necessary, the heat stored is extracted from the central portion of heat storage tank.

When injecting or extracting heat, since a heat exchange is executed mainly in the central portion in heat storage tank where convection easily occurs, a large heat transfer due to natural convection heat transfer joins in the heat transfer due to a heat conduction, and thereby an efficient heat exchange with the outside is achieved.

When conserving heat, since a heat transfer is usually generated between the outer portion in the heat storage tank and the external environment, a temperature difference due to heat transfer is generated in the heat storage tank, and consequently, a natural convection tries to arise from the heat storage material or heat transfer medium located closer to the heat storage tank. However, in the above-described heat storage devices, the suppressing means for suppressing a natural convection, disposed in the outer portion in the heat storage tank, make it difficult for the outer portion to perform a large heat transfer due to natural convection.

As described above, in the present invention, the natural convection is suppressed in the outer portion in the heat storage tank, and the natural convection generated on the surface of the heat storage material in the outer portion in the heat storage tank is hindered from extending throughout the heat storage material in the outer portion in the heat storage tank, and consequently, the heat transfer and overall heat transfer coefficient(k) due to the convection between the outer portion in the heat storage tank and the external environment is reduced, and at the same time, the heat within the heat storage material in the outer portion in the heat storage tank is hindered from transferring to the surface of the heat storage material. This creates a great temperature gradient within the heat storage material in the outer portion, and gradually reduces the temperature gradient between the surface of heat storage material and the external environment.

It is therefore possible to reduce the heat loss from the inside of the heat storage tank to the external environment while maintaining the temperature of the inside of the heat storage tank substantially constant.

In the present invention, the suppressing means against natural convection can be constituted by dispersing a liquid-absorbent material into the heat storage material or heat transfer medium in the outer portion in the heat storage tank. In this case, the above-mentioned liquid-absorbent material stagnates in the form of three-dimensional meshes in the outer portion in the heat storage tank, by adsorbing a part of the heat storage material or heat transfer medium and expanding. That is, since the heat storage material or the like comes to fill gaps within the liquid-absorbent material so as to be difficult to move, the natural convection of the heat storage material in the outer portion is suppressed, which enables the reduction in the heat loss from the inside of the heat storage tank to the outside.

As the above-mentioned suppressing means, when providing the heat storage material or heat transfer medium in the outer portion in the heat storage tank with a property of increasing viscosity by the application of voltage, and means for applying power between the pair of electrodes which are disposed on opposite sides of the outer portion in the heat storage tank so as to sandwich the outer portion, an electric field is generated in the outer portion by the application of voltage, and thereby the viscosity of the heat storage material is increased. This hinders a free movement of the heat storage material, and allows the suppression of the natural convection of the outer portion. Also, as suppressing means, when providing the heat storage material or heat transfer medium in the outer portion in the heat storage tank with a property of increasing viscosity by the application of a magnetic force, and providing a magnet for exerting a magnetic power on the outer portion in the heat storage tank, the viscosity of the heat storage material or the heat transfer medium is increased by the action of the magnetic field of the magnet. This hinders a free movement of the heat storage material, and allows the suppression of natural convection of the outer portion.

Further, the suppressing means can be constituted as a barrier disposed in the outer portion in the heat storage tank, for hindering the natural convection of the heat storage material or the heat transfer medium. In this case, since the movement of the heat storage material or heat transfer medium can physically be hindered by the barrier, appropriately disposing the barrier permits the moving speed of the heat storage material to be significantly lower than the case without hindrance, which results in the suppression of natural convection.

In addition, in the present invention, means for promoting heat transfer is provided between the central portion and the outer portion in the heat storage tank. When, for example, a rapid injection to and an extraction from the heat storage tank is required, it is possible to speedily execute a heat transfer between the central portion and the outer portion where the heat transfer from the central portion is difficult due to the suppression means against natural convection.

The heat exchange means in the present invention can be disposed so that the central portion and the outer portion in the heat storage tank are caused to sequentially perform a heat exchange with the outside. By this constitution, when injecting heat, by utilizing the residual heat remaining after the heating or cooling of the central portion in the heat storage tank, it is possible to additionally heat or cool the outer portion. On the contrary, when extracting heat, after the preheating or precooling of the heat exchanger in the outer portion in the heat storage tank, it is possible to additionally heat or cool the heat exchanger in the outer portion. This allows the exchange of heat between the heat storage device and the external environment to be executed rapidly and efficiently.

Moreover, the heat exchange means can be disposed so that the central portion and the outer portion in the heat storage tank are caused to individually perform a heat exchange with the outside. By this constitution, when injecting heat, a heat exchange can be executed in the central portion or the outer portion whichever is more suitable, in accordance with the temperature of the heat injected from the outside to the heat storage tank. On the contrary, when extracting heat, a heat exchange may be executed in the central portion or the outer portion whichever is more suitable, in accordance with the temperature of the heat required by the outside. Consequently, the exchange of heat between the heat storage device and the external environment can be executed rapidly and efficiently.

In accordance with the above-described heat storage devices associated with present invention, since the ease of convection of the heat storage material or heat transfer medium within the heat storage tank varies depending on position, the injection operation from the outside to the heat storage material and the extraction operations from the heat storage material to the outside are executed toward the central portion where a natural convection is easy to occur, while the storage of heat is executed in the central portion where a natural convection is difficult to occur. Therefore, in the processes of the injection and extraction of heat as well as in the process of conservation, the natural convection occurring within the inside of the heat storage material due to the temperature difference from the outside takes place in the central portion in the heat storage tank and hardly takes place in the outer portion, with the result that the overall heat transfer coefficient k becomes less than conventional cases. This enables the provision of a heat storage device having a low heat loss toward the outside.

Also, providing the central portion and the outer portion with heat transfer elements permits the heat transfer between the central portion and the outer portion where heat transfer does not much occur basically to be temporarily promoted, whereby it is possible to provide a heat storage device having a low heat loss as described above while executing an efficient operating of the heat storage tank in accordance with the supply and demand of heat.

Further, disposing heat exchangers so as to make a circuit through the central portion and the outer portion in the heat storage tank, permits the heat exchanger to execute a direct heat exchange with the outer portion where heat transfer does not much occur basically, and to execute an injection or an extraction of heat between the central portion and the outer portion sequentially, whereby it is possible to provide a heat storage device having a low heat loss as described above while executing the exchange of heat between the heat storage device and the outside rapidly and on a large scale. Also, individually disposing heat exchangers in the central portion and the outer portion enables a selective use of either the central portion or the outer portion each having a different temperature, or both of them, whereby it becomes possible to provide a heat storage device having a low heat loss while efficiently executing an heat change between the heat storage device and the outside in accordance with the supply and demand of heat.

DETAILED DESCRIPTION OF THE PREFERRED EMBODIMENTS

[Embodiment 1]

Figure 1:
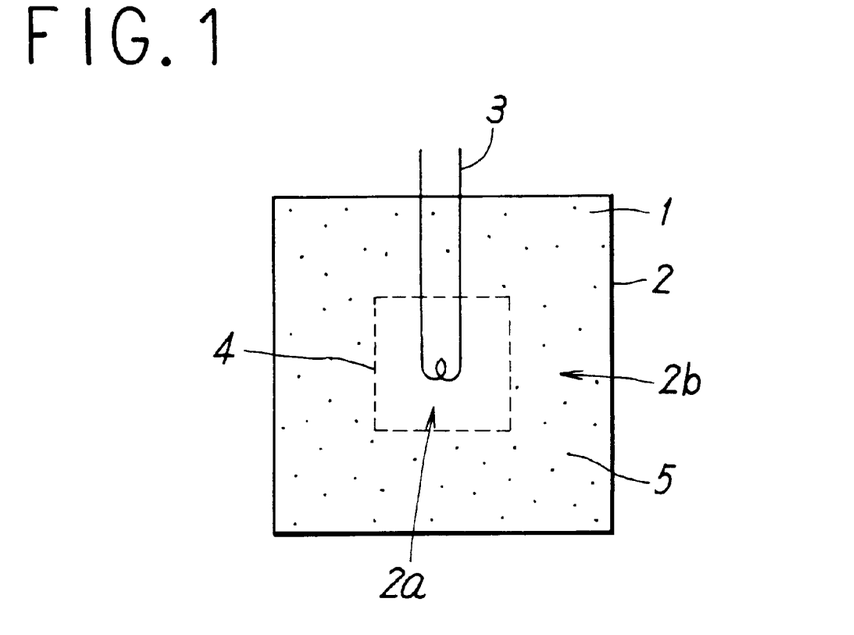
FIGS. 1 through 10 are sectional views showing varied embodiments of heat storage devices of the present invention.

FIG. 1 is an embodiment of sectional view of the heat storage device in accordance with the present invention. This heat storage device accommodates a heat storage material 1 for storing heat in a heat storage tank 2 and has a heat exchanger 3 in a heat storage tank 2, as means for executing a heat exchange with the outside. As a heat storage material 1, various materials may be used in accordance with a required heat storage temperature. The heat storage material 1 may be a material which makes a phase change in the processes of injection and extraction of heat. The inside space of the heat storage tank is divided by a net 4 into a central portion 2a and an outer portion 2b surrounding the central portion 2. That is, within the heat storage tank 2, the net 4 is stretched throughout the boundary between the central portion 2a and the outer portion 2b, and the central portion 2a is surrounded by the outer portion 2b via the net 4. A liquid-absorbent material 5 is dispersed only in the heat storage material 1 existing in the outer portion.

It is preferable that the above-mentioned net 4 has a stability toward the heat storage material 1 and the liquid-absorbent material 5, and prevents the liquid-absorbent material 5 from mixing into the central portion 2a.

The heat exchanger 3 is provided as means for executing a heat exchange between the outside of the heat storage device and the heat storage material 1 existing in the central portion 2a, and its material and structure and the like are not limited as long as it is stable toward the heat storage material 1.

Preferably, the liquid-absorbent material 5 is stable chemically and thermally toward the heat storage tank 2 and the net 4, and increases the viscosity of the heat storage material 1 existing in the outer portion 2b, whereby it can constitute suppressing means against natural convection. For such materials, various materials, for example, polymer material particles with a high water-absorbency such as starch-acrylonitrile graft polymeric hydrolysate, and fiber such as absorbent cotton are applicable.

Next, a description is given of the operation of the heat storage device shown in FIG. 1, for the case where a higher temperature than that of environment outside the heat storage device is stored.

In the injection process of heat, out of the heat storage material 1 charged into the heat storage tank 2, the one existing in the central portion 2a is heated to raise temperature, using the heat exchanger 3. Once the temperature of the heat storage material 1 of the central portion 2a is raised, the heat transfers from the central portion 2a to the outer portion 2b, and the heat storage material 1 existing in the outer portion 2b is gradually heated.

In this case, also in the injection and extraction processes of heat, temperature transfers from the outer portion 2b to the external environment surrounding the heat storage tank 2 through the wall of the heat storage tank 2. However, for the sake of simplicity, the heat loss toward the outside is described only in respect of the conservation process.

In the conservation process of heat, since heat transfers from the central portion 2a to the external environment surrounding the heat storage tank 2, the temperature of the heat storage material 1 gradually decreases. As described above, the temperature of the heat storage material 1 changes from the outer portion closer to the heat storage tank 2, and hence, in the heat transfer process, a temperature difference is generated in the direction from the central portion to the outer portion within the heat storage material 1. In this case, if the heat storage material 1 is of a free fluidity, a natural convection will be induced within the heat storage material 1.

It is well known that the strength of this natural convection is controlled by the Grashof number Gr defined by the following equation.

$$Gr = \frac{L^3 g \beta \Delta T}{v^2} \quad (3)$$

L: representative length (e.g., the height of vertical wall surface of the heat storage tank 2).
g: acceleration of gravity.
β: coefficient of volume expansion of the heat storage material 1.
ΔT: temperature difference generated within the heat storage material 1.
v: coefficient of kinematic viscosity of the heat storage material 1.

If there is no mass transfer within the heat storage material 1, the heat transfer between the heat storage material 1 and heat storage tank 2 will depend only on the direct heat transfer between component molecules/atoms which are adjacent to each other in the heat storage material 1 and the heat storage tank 2, that is, only on heat conduction. However, if there is an above-described natural convection within the heat storage material 1, there will exist, in addition to heat conduction, a fast and large heat transfer (heat transfer) due to natural convection, or mass transfer, and thus a free and active heat transfer will occur. It is well known that the strength of the heat transfer between a fluid and a solid wall surface is controlled by the Nusselt number Nu defined by the following equation.

$$Nu = \frac{hx}{\lambda} = C(Pr\ Gr)^m \quad (4)$$

h: coefficient of heat transfer between the heat storage material 1 and the heat storage tank 2.
x: distance from the bottom of the vertical wall surface of the heat storage tank 2.
λ: coefficient of heat conduction of the heat storage material 1.
Pr: Prandtl number of the heat storage material 1 (Pr=v/α, where α denotes the thermal diffusivity of the heat storage material 1).
C, m: constants determined by the state of a wall surface.

The right side of the equation (4) shows that Nusselt number Nu is a function of Prandtl number Pr and Grashof number. From the equations (3) and (4), it is seen that the coefficient of heat transfer between the heat storage material 1 and the heat storage tank 2 is expressed by:

$$h = C \frac{\lambda}{x} \left( \frac{L^3 g \beta \Delta T}{\alpha v} \right)^m \quad (5)$$

The equation (5) shows that, the higher the coefficient of heat conduction, the coefficient of volume expansion of the heat storage material 1, the vertical length of the heat storage tank 2, or the temperature difference between the heat storage material 1 and the heat storage tank 2, the higher the magnitude of the coefficient of heat transfer h, that is, the heat transfer between the heat storage material 1 and the heat storage tank 2 becomes, and that, on the contrary, the higher the thermal diffusivity, or the coefficient of kinematic viscosity of the heat storage material 1, the lower the transfer between the heat storage material 1 and the heat storage tank 2 becomes.

The quantity of heat transfer from the heat storage material 1 to the outside follows the equation (2), and the higher the coefficient of heat transfer h between the heat storage material 1 and the heat storage tank 2, the higher the heat loss from the heat storage material 1 to the external environment becomes, because the overall heat transfer coefficient k becomes higher responding the sensitively to such an increase in the coefficient of heat transfer h.

In the heat storage device of this embodiment, since the heat storage material 1 existing in the outer portion 2b undergoes an action that is equal to the action of increasing viscosity v from the liquid-absorbent material 5 dispersed in the outer portion 2b, a natural convection becomes difficult to arise as suggested by equation (3), and as a consequence, the heat transfer between the heat storage material 1 existing in the outer portion 2b and the heat storage tank 2 decreases as suggested by the equation (5), leading to a lower heat loss toward the outside.

In the traction process of heat, it is possible to extract the heat corresponding to the temperature of the heat storage material 1, from the heat storage tank 2, using the heat exchanger 3. As the temperature of the heat storage material 1 existing in the central portion 2a decreases as a result of the heat extraction, the heat storage material 1 existing in the outer portion 2b is gradually cooled.

[Embodiment 2]

Figure 2:
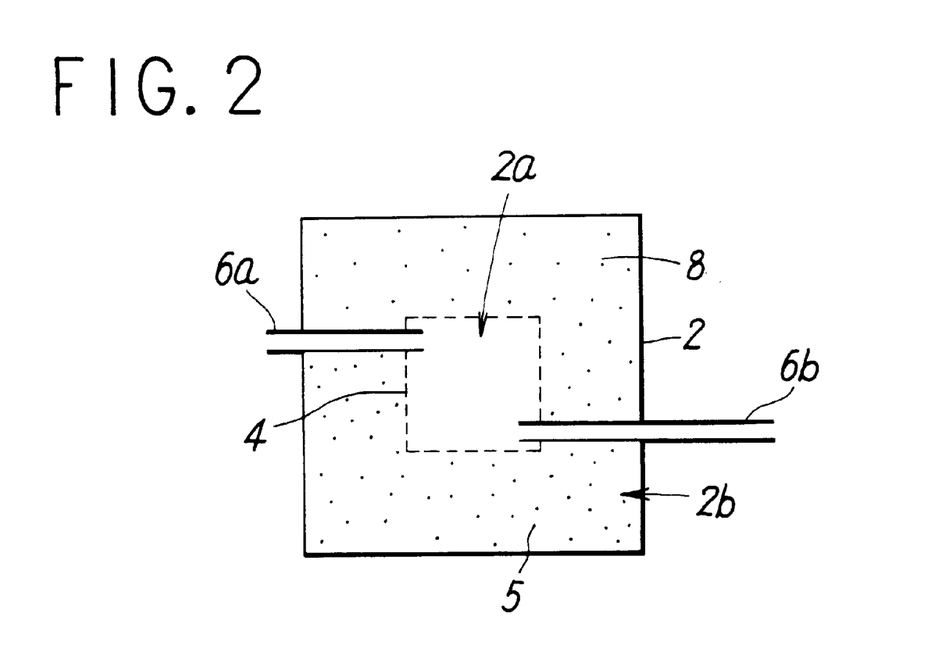

FIG. 2 is a sectional view of another embodiment of the heat storage device in accordance with the present invention. This heat storage device accommodates a heat transfer medium 8 which also serves as a heat storage material, in a heat storage tank 2. However, unlike the case of FIG. 1, this heat storage device makes communicate the central portion 2a surrounded by a net 4 in the heat storage tank 2, with the outside of the heat storage device by two communicating tubes 6a and 6b which execute the inflow and outflow of the transfer medium 8. The other constructions are similar to the embodiment shown in FIG. 1.

Next, a description is presented of the operation of the heat storage device in the case where a higher temperature than that of the external environment is stored in the heat storage device shown in FIG. 2.

In the injection process of heat, the heat transfer medium 8 sucked out from the communicating tube 6b is heated by a heat source at the outside, and is circulated back to the heat storage tank 2 using the communicating tube 6b. As a consequence, the temperature of the heat transfer medium 8 existing in the central portion 2a rises, with the result that heat is injected to the heat storage tank 2. As the temperature of the heat transfer medium 8 in the central portion 2a rises, the heat transfer medium 8 in the outer portion 2b is gradually heated.

In the conservation process of heat, since heat transfers to the external environment surrounding the heat storage tank 2, the temperature of the heat transfer medium 8 gradually decreases. However, as in the case of the operation in FIG. 1, a natural convection becomes difficult to occur due to the liquid-absorbent material 5 dispersed in the outer portion 2b, and consequently, the heat transfer between the heat transfer medium 8 existing in the outer portion 2b and the heat storage tank 2 decreases, leading to a lower heat loss toward the outside.

In the traction process of heat, the heat transfer medium 8 accommodated in the heat storage tank 2 is sucked out from the communicating tube 6a, and is utilized at the outside as a heat source having the temperature of the heat transfer medium 8. The heat transfer medium 8 cooled as a result of the thermal utilization is circulated back to the heat storage tank 2 through the communicating tube 6b. As the temperature of the heat transfer medium 8 existing in the central portion 2a decreases as a result of the heat extraction, the temperature of the heat transfer medium 8 existing in the outer portion 2b is gradually cooled.

[Embodiment 3]

Figure 3:
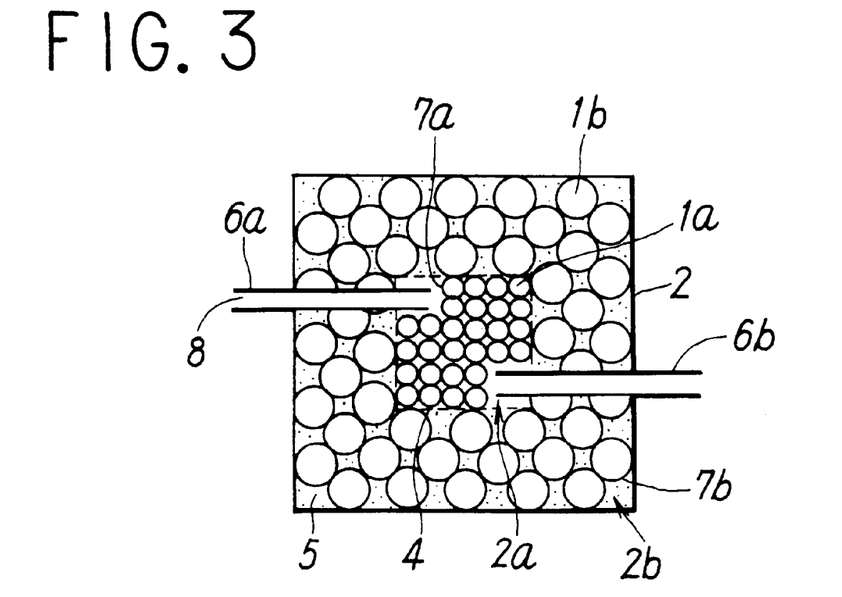

FIG. 3 is a sectional view of another embodiment of the heat storage device in accordance with the present invention. In this heat storage device, in a heat storage tank 2 having a similar construction as the embodiment shown in FIG. 2, heat storage materials 1a and 1b to be accommodated in the central portion 2a and the outer portion 2b are accommodated in small vessels 7a and 7b, respectively. As heat storage materials 1a and 1b, various materials may be used in accordance with required temperatures. The heat storage material may be a material which makes a phase change in the processes of injection and extraction. Further, the heat storage materials 1a and 1b which exist respectively in the central portion 2a and the outer portion 2b in a heat storage tank 2 may be an identical material, or may be different materials.

In the drawing, though small vessels 7a and 7b in this embodiment are represented by a spherical shape, the material and shape of the small vessel are not limited, as long as the small vessels are stable toward the heat storage materials 1a and 1b and the heat transfer medium 8, and the dimensions of the small vessels may be different between those in the central portion 2a and those in the outer portion 2b, or may be the same.

Next, a description is given of the operation of the heat storage device in the case where a higher temperature than that of environment outside the heat storage device is stored in the heat storage device shown in FIG. 3.

In the injection process of heat, as in the case of the embodiment shown in FIG. 2, the heat transfer medium 8 heated at the outside is circulated back to the heat storage tank, and consequently, heat transfers from the heat transfer medium 8 to the heat storage materials 1a, the temperature thereof rising, thereby heat being injected to the heat storage tank 2. As the temperature of the heat storage material 1a existing in the central portion 2a rises, the heat storage material 8 existing in the outer portion 2b is gradually heated.

In the conservation process of heat, since heat transfers to the external environment surrounding the heat storage tank 2, the temperature of the heat transfer medium 8 gradually decreases. However, as in the case of the operation in FIG. 1, it becomes difficult for a natural convection to occur due to the liquid-absorbent material 5 dispersed in the outer portion 2b, and consequently, the heat transfer between the heat transfer medium 8 existing in the outer portion 2b and the heat storage tank 2 decreases, leading to a lower heat loss toward the outside.

The traction process of heat is substantially the same as that of the embodiment shown in FIG. 2.

[Embodiment 4]

Figure 4:
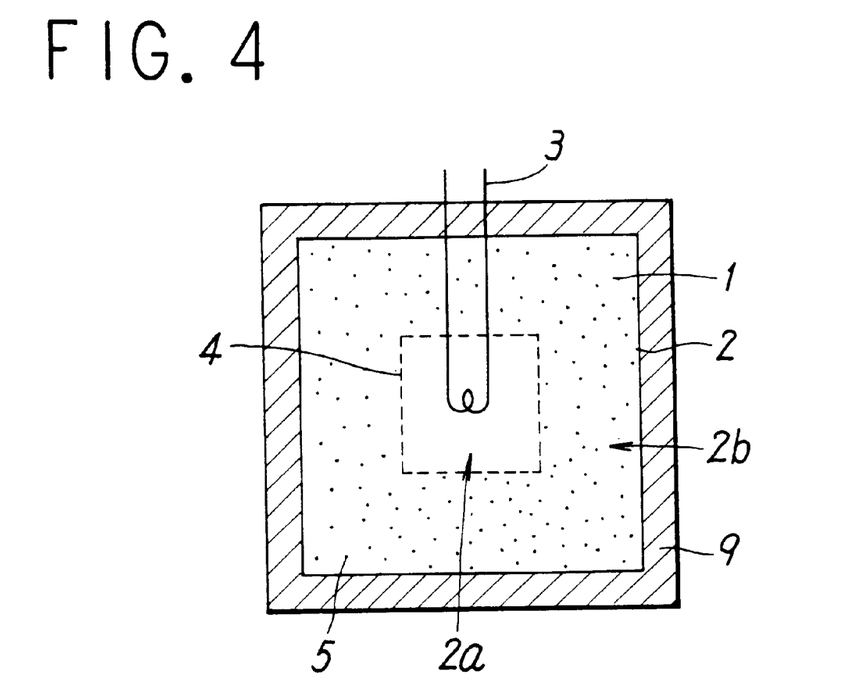

FIG. 4 is a sectional view of another embodiment of the heat storage device in accordance with the present invention. Although this heat storage device has substantially the same construction as that of the embodiment shown in FIG. 1, it has a thermal insulating layer 9 outside a heat storage tank 2. Therefore, the description of the common parts with the embodiment shown in FIG. 1 is omitted, and the common referential numerals are marked with the identical numerals in FIG. 4.

Next, a description is given of the operation of the heat storage device in the case where a higher temperature than that of environment outside the heat storage device is stored in the heat storage device shown in FIG. 4.

The operation in the injection process of heat is basically the same as that of the embodiment 1.

Although the operation in the conservation process of heat is also basically the same as that of the embodiment 1, the coefficient of heat conduction of the thermal insulating layer 9 is lower than that of the heat storage tank 2, so that it is possible to reduce the overall heat transfer coefficient k shown in the equation (2) and to provide a heat storage device with a further lower heat loss.

The operation in the extraction process of heat is basically the same as that of the embodiment 1.

In this embodiment, a case is shown where the heat storage tank and the like is same as those in the embodiment 1, but these operations are applicable also for such constructions as shown in the embodiment 2 or 3.

[Embodiment 5]

Figure 5:
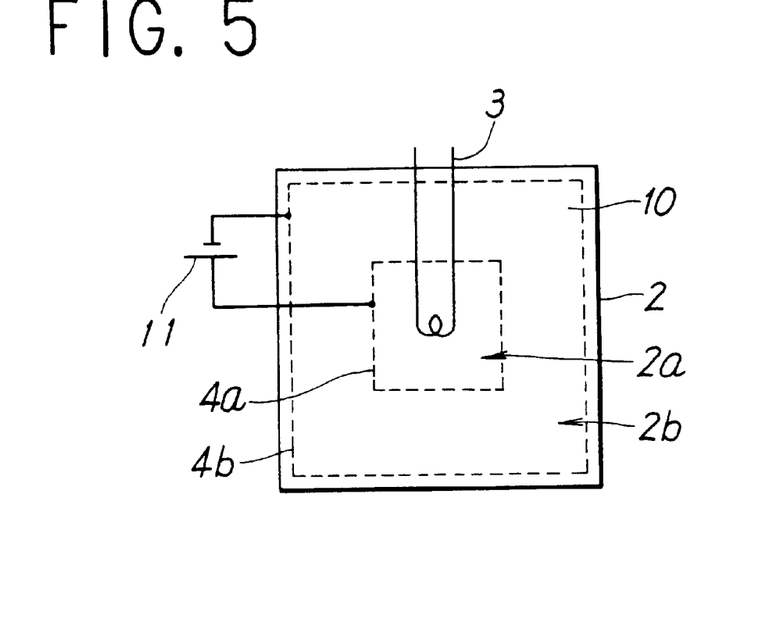

FIG. 5 is a sectional view of another embodiment of the heat storage device in accordance with the present invention. Although this heat storage device has a similar heat storage tank 2 and a heat exchanger 3 to the embodiment shown in FIG. 1, it has an electrode 4a so as to spatially separate the central portion 2a and the outer portion 2b, in place of the net 4 shown in FIG. 1. Also, an electrode 4b is stretched around in the vicinity of the inner surface of the heat storage tank 2. The electrodes 4a and 4b are disposed on opposite sides so as to sandwich the outer portion 2b, each connected to a power supply 11. Inside the heat storage tank 2, an electrorheological fluid 10 is charged, which has a property of increasing viscosity by application of voltage and which serves as a heat storage material.

The material and structure of the electrodes 4a and 4b are not limited, as long as they are capable of generating a uniform electric field in the outer portion 2b by the application of voltage to the power supply 11. They may, for example, be reticular. Preferably, the electrorheological fluid 10 is stable toward the heat storage tank 2, the heat exchanger 3, the electrodes 4a and 4b. For an electrorheological fluid, various materials such as, for example, a liquid which is suspending carbon particles are applicable in accordance with required heat storage temperatures.

Next, an explanation is presented of the operation of the heat storage device in the case where a higher temperature than that of the external environment is stored in the heat storage device shown in FIG. 5.

In the injection process of heat, out of the electrorheological fluid (heat storage material) 10 accommodated in the heat storage tank 2, the one existing in the central portion 2a is heated to raise temperature, using the heat exchanger 3, and thereby the electrorheological fluid 10 existing in the outer portion 2b is gradually heated.

If the quantity of heat supplied from the outside to the heat storage device is lower than or equal to that of the quantity of heat diffusing from the central portion 2a to the outer portion 2b, then a voltage is applied between 4a and 4b by the power supply 11. As a consequence, an electric field is generated between 4a and 4b, and the viscosity of the electrorheological fluid 10 existing in the outer portion 2b sandwiched by the electrodes 4a and 4b is increased, resulting in a lower heat loss toward the outside.

If the quantity of heat supplied from the outside to the heat storage device is larger than the quantity of heat diffusing from the central portion 2a to the outer portion 2b, then it will be possible to reduce the viscosity of the outer portion 2b by not applying a voltage between the electrodes 4a and 4b, and to allow the heat transfer from the central portion 2a to the outer portion 2b to freely take place, thereby causing the heat injected from the outside to be absorbed efficiently into the heat storage tank 2.

In the conservation process of heat, a voltage is applied to the electrodes 4a and 4b by the power supply 11. The application of a voltage reduces the heat loss from the heat storage device to the outside for the foregoing reason.

In the extraction process of heat, the heat corresponding to the temperature of the electrorheological fluid 10 can be extracted from the heat storage tank 2 through the heat exchanger 3. As the temperature of the electrorheological fluid 10 in the outer portion 2b decreases as a result of the extraction of heat, the electrorheological fluid 10 in the central portion 2a gradually cooled.

If the quantity of heat required of the heat storage device by the outside is met by the heat conserved in the central portion 2a, a voltage will be applied to the electrodes 4a and 4b by the power supply 11. The application of a voltage reduces the heat loss from the heat storage device to the outside for the foregoing reason. If the quantity of heat required of the heat storage device by the outside is not met by only the heat conserved in the central portion 2a, it will be possible to reduce the viscosity of the outer portion 2b by not applying a voltage between the electrodes 4a and 4b, and to allow the heat transfer from the outer portion 2b to the central portion 2a to freely take place, thereby causing the heat needed at the outside to be extracted efficiently from the heat storage tank 2.

Further, as in the case of embodiment 4, a heat storage device having a lower heat loss can be achieved by covering the heat storage tank with the thermal insulating layer 9.

[Embodiment 6]

Figure 6:
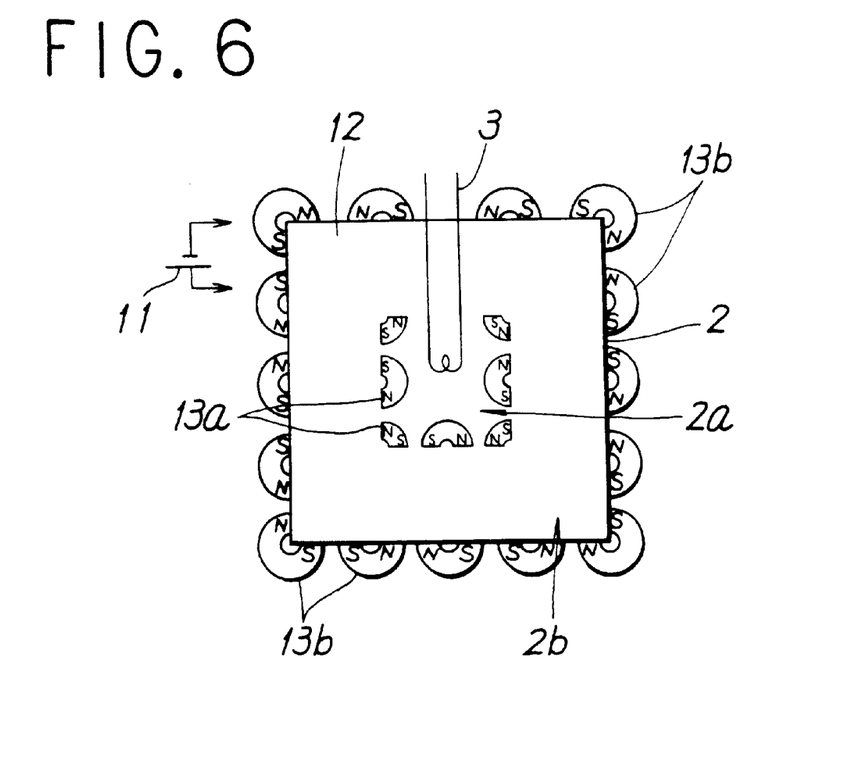

FIG. 6 is a sectional view of another embodiment of the heat storage device in accordance with the present invention. This heat storage device has a similar heat storage tank 2 and heat exchanger 3 to the embodiment shown in FIG. 1, but in the heat storage tank 2 a magnetic fluid 12 is charged, which has a property of increasing viscosity by the application of a magnetic field.

On the boundary between the central portion 2a and the outer portion 2b in the heat storage tank 2, and outside the heat storage tank 2, a multitude of electromagnets 13a and 13b which generate a magnetic force by a application of an external power supply, are disposed by an arbitrary number. In the drawing, the wiring between the electromagnets 13a and 13b and the power supply 11 are omitted.

The electromagnet 13a is disposed so that the magnetic poles face away from the central portion 2a, and on the contrary, the electromagnet 13b is disposed so that the magnetic poles face away from the outside of the heat storage device. The material and structure of electromagnets 13a and 13b are not limited as long as they can generate a magnetic field only in the outer portion. For example, permanent magnets may be used in place of the electromagnets 13a and 13b. Also in that case, the basic operation is the same. For an electrorheological fluid 12, various materials, such as a liquid which is suspending carbon particles, are applicable in accordance with required heat storage temperatures.

The processes of injection, conservation and extraction of heat in the heat storage device shown in FIG. 6 are the same as those in the embodiment shown in FIG. 5, except that the viscosity of the magnetic fluid 12 is increased by the generation of the magnetic field through the energizing of the electromagnets 13a and 13b in place of the generation of electric field.

The operation in the case where the electromagnets 13a and 13b are replaced with permanent magnets is the same as that of the case where the electromagnets 13a and 13b are energized. Further, as in the case of the embodiment 4, a heat storage device with a lower heat loss can also be achieved by covering the heat storage tank with the thermal insulating layer 9.

[Embodiment 7]

Figure 7:
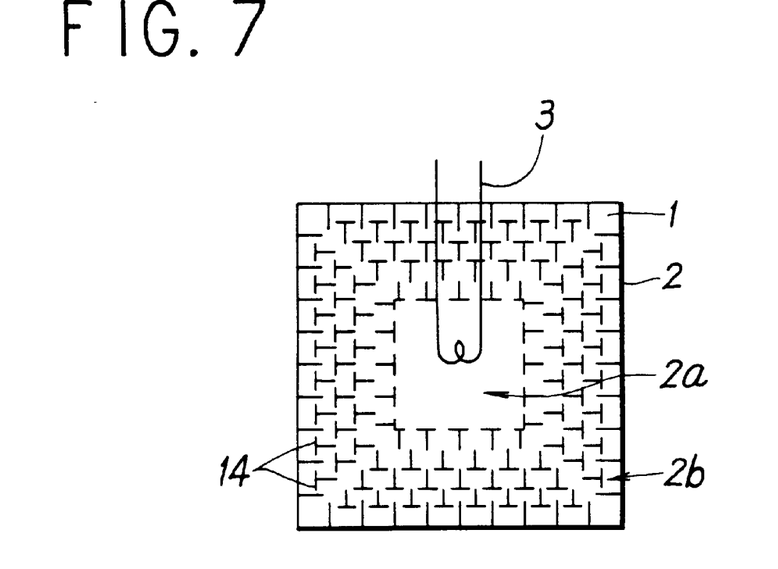

FIG. 7 is a sectional view of another embodiment of the heat storage device in accordance with the present invention. This heat storage device accommodates a heat storage material 1 for storing heat, in a heat storage tank 2 thereof, and has a heat exchanger 3 for executing a heat exchange with the outside, in the heat storage tank 2, as in the case of the embodiment shown in FIG. 1. However, it has a multitude of barriers 14 disposed in the outer portion 2b partitioned by a net 4 in the a heat storage tank 2. For the barriers 14, for example, reticular ones may be applicable.

In this embodiment, a liquid-absorbent material 5 used in the embodiment shown in FIG. 1 is not used, but it may be employed. Because other constructions are the same as the embodiment shown in FIG. 1, description of them is omitted.

Next, an explanation is presented of the operation of the heat storage device in the case where a higher temperature than that of environment outside the heat storage device is stored in the heat storage device shown in FIG. 7.

The operation in the injection process of heat is basically the same as that of the embodiment 1. In the conservation process of heat, since heat transfers from the central portion 2a to the external environment, the temperature of the heat storage material 1 gradually decreases. However, even if the heat storage material 1 of the outer portion 2b tries to transfer to the central portion 2a, it will repeatedly collide against the minutely intricated barriers 14, so that the moving speed of the heat storage material 1 becomes lower than the case without the barriers 14, and thereby the heat storage material 1 undergoes an action that is apparently equal to the action of increasing viscosity v of the heat storage material 1 existing in the outer portion 2b, which leads to a lower heat loss toward the outside.

The operation in the extraction process of heat is also basically the same as that of the embodiment 1. Further, as in the case of the embodiment 4, a heat storage device having a lower heat loss can be achieved by covering the heat storage tank with the thermal insulating layer 9.

[Embodiment 8]

Figure 8:
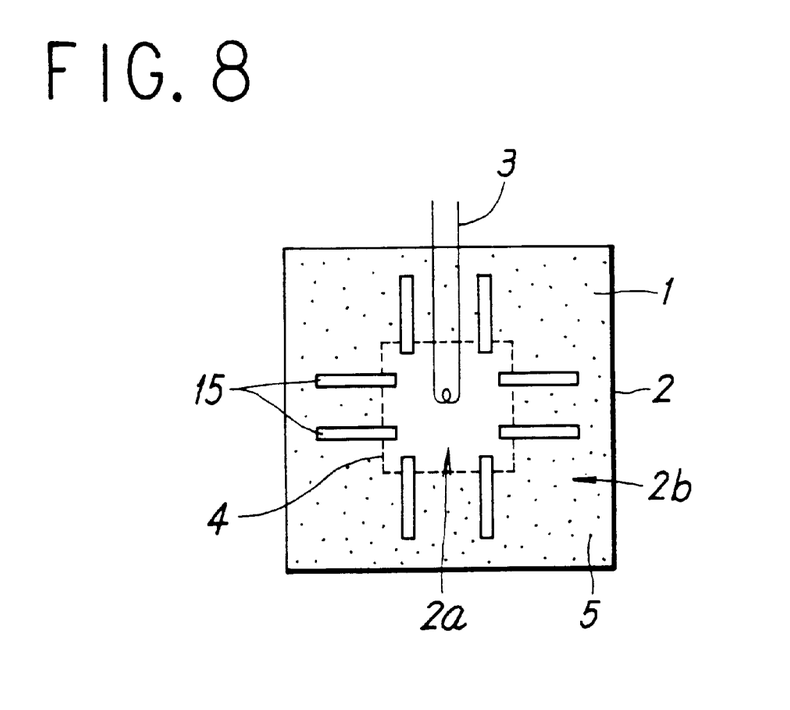

FIG. 8 is a sectional view of another embodiment of the heat storage device in accordance with the present invention. This heat storage device has basically the same construction as the embodiment shown in FIG. 1, and in the outer portion 2b partitioned by a net 4 in a heat storage tank 2, a liquid-absorbent material 5 is dispersed in a heat storage material 1. Further, a heat transfer element 15 capable of arbitrarily promoting heat transfer is disposed between the central portion 2a and the outer portion 2b in the heat storage tank. The heat transfer element 15 may be, for example, one capable of transporting any quantity of heat in any direction by the application of voltage, or may be one which markedly varies in the heat transfer resistance with temperature, such as a heat pipe.

Next, an explanation is presented of the operation of the heat storage device in the case where a higher temperature than that of the external environment is stored in the heat storage device shown in FIG. 8.

The operation in the injection process of heat is basically the same as the case of the embodiment 1. However, if the quantity of heat supplied by the outside is more than heats the heat storage material 1 of the central portion 2a, it is possible, in addition to the procedure in the embodiment 1, to promote the heat transfer from the central portion 2a to the outer portion 2b by the heat transfer element 15, and thereby store the heat supplied by the outside in the heat storage device as completely and rapidly as possible. The operation in the conservation process of heat is also similar to that of the embodiment 1, and the heat loss from the heat storage device is less than conventional cases.

The operation in the extraction process of heat is also basically the same as that of the embodiment 1. However, if the quantity of heat supplied by the outside is not met by only the use of the heat stored in the heat storage material 1 existing in the central portion 2a, it is possible, in addition to the procedure in the embodiment 1, to promote the heat transfer from the outer portion 2b to the central portion 2a by the heat transfer element 15, and thereby to extract the heat required by the outside from the heat storage device as completely and rapidly as possible.

In this embodiment, a case where the heat storage tank and the like are similar to those in the embodiment 1 is shown, but similar operations to the foregoing can be achieved also in the case of such constructions as shown in the embodiments 2 through 7.

[Embodiment 9]

Figure 9:
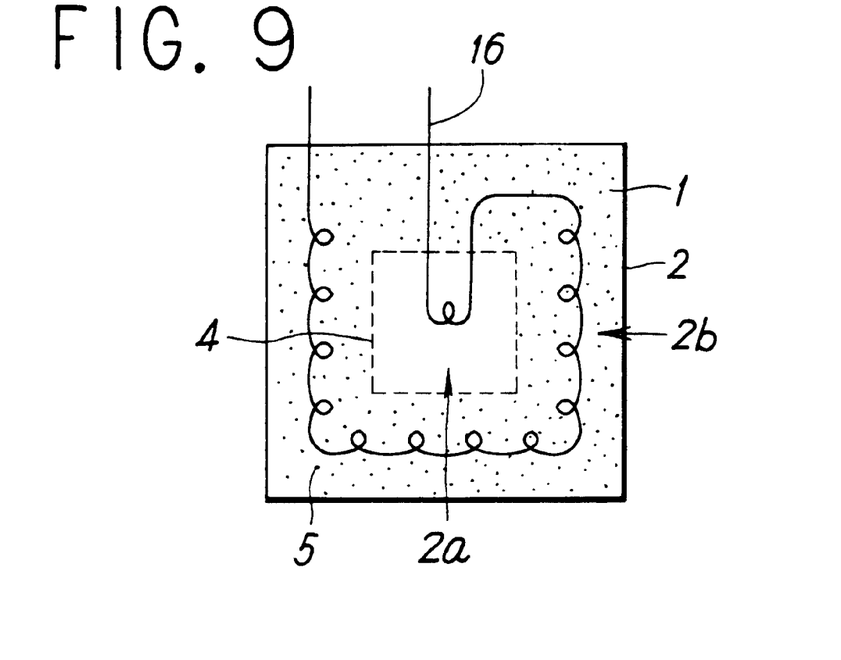

FIG. 9 is a sectional view of another embodiment of the heat storage device in accordance with the present invention. This heat storage device has basically the same construction as the embodiment shown in FIG. 1, and provides a heat storage tank 2 with an heat exchanger 16 disposed so as to sequentially pass the central portion 2a and the outer portion 2b, for executing a heat exchange between the outside. Also, a liquid-absorbent material 5 is dispersed in the heat storage material 1 of the outer portion 2b partitioned by a net 4 in the heat storage tank 2. With regard to the heat exchanger 16, the constitutions such as material, the cross-sectional profile, and the presence or absence of a fin is not limited, as long as the heat exchanger 16 has a stability toward the heat storage material 1.

Next, an explanation is presented of the operation of the heat storage device in the case where a higher temperature than that of the external environment is stored in the heat storage device shown in FIG. 9.

The operation in each process is basically the same as that of the embodiment 1. In the injection process of heat, firstly the central portion 2a of the heat storage material 1 charged into heat storage tank 2 is heated to increase temperature using the heat exchanger 16. Next, the heat storage material 1 of the outer portion 2b is heated by using the residual heat. In the embodiment 1, the heat storage material 1 of the outer portion 2b is gradually heated through the heat transfer due to the temperature increase of the heat storage material 1 of the central portion 2a, but the outer portion 2b has a high apparent viscosity as described in the embodiment 1, so that a heat transfer is difficult to occur. By utilizing the heat exchanger 16, a more rapid injection of heat than the case of the embodiment 1 can be achieved.

The conservation process of heat is similar to that of the embodiment 1.

In the extraction process of heat, by using the heat existing in the outer portion 2b out of the heat storage material 1 charged into the heat storage tank 2, the heat transfer medium to perform a heat exchange with the outside are heated by way of preheating. Next, the heat transfer medium is heated by the heat of the heat storage material 1 of the central portion 2a. In this embodiment, as in the case of the embodiment 1, the outer portion 2b is high in apparent viscosity so as to be difficult to perform heat transfer. However, use of the heat exchanger enables a more rapid injection of heat than the case of the embodiment 1.

In this embodiment, a case where the heat storage tank and the like are similar to those in the embodiment 1 is shown, but similar operations to the forgoing can be achieved also when applied to such structures as shown in the embodiments 2 through 8.

[Embodiment 10]

Figure 10:
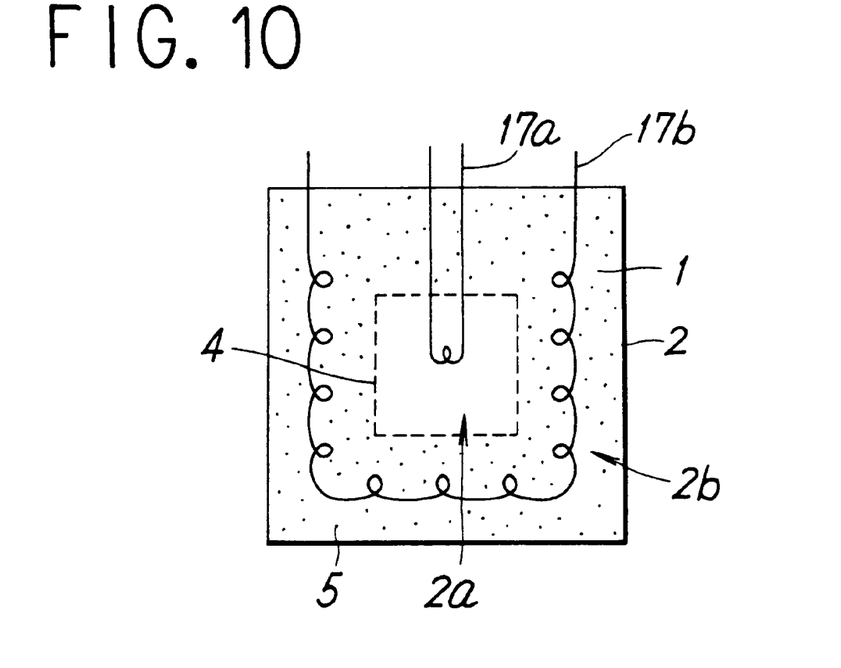

FIG. 10 is a sectional view of another embodiment of the heat storage device in accordance with the present invention. This heat storage device has heat exchangers 17a and 17b capable of heating or cooling the central portion 2a and the outer portion 2b in a heat storage tank 2 individually, in place of the heat exchanger 16 in the embodiment shown in FIG. 9. Since the material of the heat exchanger 17a and 17b are the same as those of the embodiment shown in FIG. 9 and the other constructions are also the same as those of the embodiment shown in FIG. 9, description of constructions is omitted.

Next, an explanation is presented of the operation of the heat storage device in the case where a higher temperature than that of the external environment is stored in the heat storage device shown in FIG. 10.

The operation in each process is basically the same as that of the embodiment 1. In the injection process of heat, procedure varies in accordance with the following three cases.

A first procedure is adopted when the temperature of the heat source is higher than that of the central portion 2a of the heat storage material 1, and at the same time, when the quantity of the heat of the heat source is more than heats the central portion 2a. At this time, the heat transfer medium which exchanges heat with the outside is first sent from the heat source to the heat exchanger 17a, and heats the heat storage material 1 of the central portion 2a, being then returned to the outside. However, since the temperature of this heat transfer medium returned is higher than that of the heat storage material 1 of the outer portion 2b, the heat transfer medium is next sent to the heat exchanger 17b, and heats the heat storage material 1 of the outer portion 2b, being then returned to the outside. This makes it possible to rapidly heat the heat storage material 1 of the outer portion 2b and to improve the efficiency of heat exchange in the heat source. This is because the temperature difference at heat exchange in the heat source becomes large as compared with the case where only the heat storage material 1 of the central portion 2a is heated, since the heat transfer medium sent from the heat source is returned thereto with the temperature decreased.

A second procedure in the injection process of heat is adopted when the temperature of the heat source is higher than that of the central portion 2a of the heat storage material 1, and at the same time, when the quantity of the heat of the heat source is all that is needed to heat the central portion 2a. At this time, the heat transfer medium from the heat source is sent to the heat exchanger 17a, and heats the heat storage material 1 of the central portion 2a, being then returned to the heat source. Although the temperature of this heat transfer medium returned from the 17a is higher than that of the heat storage material 1 of the outer portion 2b, further heat transfer medium can not be sent to the heat exchanger 17b, unlike the case of the first procedure. This is because the quantity of heat of the heat source in this case is not sufficient, and hence the heat transfer medium which has further decreased in temperature as a result of usage of the heat exchanger can not be heated by the heat source to a higher temperature than that of the heat storage material 1 of the central portion 2a, with the result that a circulation wherein heat starts from the heat source and returns thereto via the heat exchangers 17a and 17b can not thermally exist.

A third procedure in the injection process of heat is adopted when the temperature of the heat source is lower than that of the central portion 2a of the heat storage material 1, and at the same time, when it is higher than that of the heat storage material 1 of the outer portion 2b. In this case, the heat transfer medium is sent to the heat exchanger 17a, and heats the heat storage material 1 of the outer portion 2b, being then returned to the heat source. Since the temperature of the outer portion 2b lies between the temperature of the central portion 2a and the that of environment outside the heat storage device, it is possible to cause the heat storage device to efficiently store the energy of the heat source by using the heat exchanger 17b alone, even if the temperature of the heat source is not sufficiently high.

In the conservation process of heat, as in the case of the embodiment 1, the apparent viscosity of the heat storage material 1 of the outer portion 2b is high so that the heat loss toward the outside is low.

Also in the extraction process of heat, the procedure varies in accordance with the following three cases.

A first procedure is adopted when the temperature of the heat needed at the outside is close to that of the heat storage material 1 of the central portion 2a, and at the same time, when it can not be met by only the heat of the central portion 2a. At this time, the heat transfer medium exchanging heat with the outside is first sent from the heat source to the heat exchanger 17b, and is preheated by the heat storage material 1 of the outer portion 2b, being then once returned to the outside. Since the temperature of the heat transfer medium returned from the heat exchanger 17b is lower than that of the heat storage material 1 of the central portion 2a, the heat transfer medium is next sent to the heat exchanger 17a, and is heated by the heat storage material 1 of the central portion 2a, being then returned to the outside. This makes it possible to rapidly extract the heat of the heat storage material 1 of the outer portion 2b and to suppress a rapid temperature decrease of the central portion 2a caused by a large load from the outside.

A second procedure in the extraction process of heat is adopted when the temperature of the heat needed at the outside is close to that of the heat storage material 1 of the central portion 2a, and at the same time, when it can be met by the quantity of heat extracted from the central portion 2a. At this time, the heat transfer medium from the outside is sent to the heat exchanger 17a, and is heated by the heat storage material 1 of the central portion 2a, being then returned to the outside for utilizing.

A third procedure in the extraction process of heat is adopted when the temperature of the heat needed at the outside is lower than that of the heat storage material 1 of the central portion 2a, but at the same time, when it is higher than that of the heat storage material 1 of the outer portion 2b. In this case, the heat transfer medium from the outside is heated by the heat exchanger 17b, and then it is returned to the outside for utilizing. If the whole of the heat transfer medium is sent from the outside to the heat exchanger 17a, the temperature of the heat storage material 1 of the central portion 2a having a higher temperature than the outer portion 2b is reduced, which causes a decrease in the temperature of the heat storage material 1 existing in the central portion 2a having a temperature higher than that of the outer portion 2b. This is undesirable because the effective energy (exergy) of the heat storage device is rendered less, even if the quantity of heat to be extracted from the heat storage device to the outside is the same.

A third procedure is to prevent the reduction in the effectiveness of heat storage device as much as possible, by extracting the heat from a suitable portion of the heat storage material 1 corresponding to the temperature of the heat required by the outside. This makes it possible to provide a heat storage device that efficiently operates in spite of a wide variation in supply and demand of heat. In this embodiment, a case where the heat storage tank and the like are similar to those in the embodiment 1 is shown, but similar operations to the foregoing can be achieved also in the case of such constructions as shown in the embodiments 2 through 8.

Incidentally, when the heat of a temperature lower than that of the environment outside heat storage device is stored in the storage device of each embodiment, only the high-lower relation of temperature between the storage device and the external environment, and the direction of heat flow become opposite to those of each of the above-described embodiments. However, the basic operation is the same as a corresponding embodiment.

The shape of the heat storage tank 2 in these embodiments are not limited to the cuboid shape as shown in the drawings. Various shapes such as cylindrical, or spherical shape may also be adopted.

What is claimed is:

1. A heat storage device comprising:

a heat storage tank charged with a heat storage material for storing heat from outside the heat storage tank, said heat storage tank having a central portion and an outer portion, said outer portion surrounding said central portion;

heat exchange means for executing an injection and an extraction of heat between inside and outside the heat storage tank by heat exchange between said heat storage material and a heat transfer medium, said heat exchange means being disposed so that the central portion and outer portion of said heat storage tank are caused to sequentially perform heat exchange with outside the heat storage tank;

suppressing means for suppressing natural convection of the heat storage material, said suppressing means being disposed in the outer portion of the heat storage tank; and a partitioning device positioned between said central and outer portions of said heat storage tank and configured to be permeable for the heat storage material and impermeable for the suppressing means.

2. A heat storage device as claimed in claim 1, wherein said partitioning device comprises a net.

3. A heat storage device comprising:

a heat storage tank charged with a heat storage material for storing heat from outside the heat storage tank said heat storage tank having a central portion and an outer portion, said outer portion surrounding said central portion;

heat exchange means for executing an injection and an extraction of heat between inside and outside the heat storage tank by heat exchange between said heat storage material and a heat transfer medium, said heat exchange means being positioned to execute heat exchange between the central portion of said heat storage tank and outside the heat storage tank;

suppressing means for suppressing natural convection of the heat storage material, said suppressing means being disposed in the outer portion of the heat storage tank; and a partitioning device positioned between said central and outer portions of said heat storage tank and configured to be permeable for the heat storage material and impermeable for the suppressing means.

4. A heat storage device as claimed in claim 1, wherein said suppressing means comprises a liquid-absorbent material dispersed in the heat storage material or the heat transfer medium in the outer portion of the heat storage tank.

5. A heat storage device as claimed in claim 3, wherein said partitioning device comprises a net.

6. A heat storage device as claimed in claim 4, wherein said liquid-absorbent material comprises at least one of a polymer particles capable of a high water-absorbency and a fiber material.

7. A heat storage device as claimed in claim 6, wherein said polymer particles capable of a high water-absorbency comprises starch-acrylonitrile graft polymeric hydrolysate, and said fiber comprises absorbent cotton.

* * * * *